US012772153B2

(12) United States Patent
Mu

(10) Patent No.: US 12,772,153 B2
(45) Date of Patent: Oct. 20, 2026

(54) ACCESS CONTROL METHOD AND APPARATUS, COMMUNICATION DEVICE, AND MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 650 days.

(21) Appl. No.: 18/256,146

(22) PCT Filed: Dec. 9, 2020

(86) PCT No.: PCT/CN2020/134979
§ 371 (c)(1),
(2) Date: Jun. 6, 2023

(87) PCT Pub. No.: WO2022/120649
PCT Pub. Date: Jun. 16, 2022

(65) Prior Publication Data
US 2024/0040490 A1 Feb. 1, 2024

(51) Int. Cl.
*H04W 48/16* (2009.01)
*H04W 48/10* (2009.01)

(52) U.S. Cl.
CPC ........... *H04W 48/16* (2013.01); *H04W 48/10* (2013.01)

(58) Field of Classification Search
CPC .............................. H04W 48/16; H04W 48/10
USPC ........................................................ 455/434
See application file for complete search history.

(56) References Cited

U.S. PATENT DOCUMENTS

2023/0292267 A1 9/2023 He
2023/0292336 A1 9/2023 Liu et al.

FOREIGN PATENT DOCUMENTS

| | | | | |
|---|---|---|---|---|
| CA | 3070072 | A1 * | 1/2019 | .......... H04J 11/0069 |
| CN | 110022191 | A | 7/2019 | |
| CN | 111527783 | A | 8/2020 | |
| CN | 111726821 | A | 9/2020 | |
| CN | 111934834 | A | 11/2020 | |
| EP | 3 726 895 | A1 | 10/2020 | |
| IN | 202037018001 | A | 6/2020 | |
| WO | WO 2020/103161 | A1 | 5/2018 | |
| WO | WO 2019/136646 | A1 | 7/2019 | |
| WO | WO 2020/186946 | A1 | 9/2020 | |

OTHER PUBLICATIONS

Extended European Search Report issued in Application No. 20964591.0 dated Oct. 11, 2024, 9 pages.

(Continued)

*Primary Examiner* — Chuck Huynh
(74) *Attorney, Agent, or Firm* — Finnegan, Henderson, Farabow, Garrett & Dunner, L.L.P.

(57) ABSTRACT

An access control method includes: acquiring a first synchronization signal/physical broadcast channel block (SSB), wherein the first SSB includes access information for indicating a second SSB; reading the access information of the second SSB from the first SSB and acquiring the second SSB according to the access information; and performing access according to the second SSB.

18 Claims, 3 Drawing Sheets

(56) References Cited

OTHER PUBLICATIONS

Spreadtrum Communications, Remaining issues on initial access signals/channels, 3GPP TSG RAN WG1 #100-e, R1-2000418, e-Meeting, Feb. 24-Mar. 6, 2020, 10 pages.
International Search Report of International Application No. PCT/CN2020/134979, dated Aug. 31, 2021, 2 pages.
Vivo; "Discussion on enhancements to initial access procedure," 3GPP TSG RAN WG1 #96bis, R1-1904066, Xi'an, China, Apr. 8-12, 2019, 10 pages.
Notification to Grant Patent Right for Invention, for Chinese Application No. 202080003767.3 dated Jan. 9, 2024, 6 pages.

* cited by examiner

ACCESS CONTROL METHOD AND APPARATUS, COMMUNICATION DEVICE, AND MEDIUM

CROSS-REFERENCE TO RELATED APPLICATION

The present application is the U.S. National phase application of International Application No. PCT/CN2020/134979, filed on Dec. 9, 2020, the entire content of which is incorporated herein by reference.

TECHNICAL FIELD

The present disclosure relates to the field of wireless communication technology, and in particular, to an access control method and apparatus, communication device, and medium.

BACKGROUND

Due to the need for coverage enhancement of a Reduced Capability (Redcap) terminal and the limited reception capability of the Redcap terminal, a separate initial Down Link (DL) Bandwidth Part (BWP) or initial Up Link (UL) BWP needs to be configured for the Redcap terminal. Moreover, for the Redcap terminal, if the Synchronization Signal/Physical Broadcast Channel (PBCH) Block, called SSB, is not included in the initial DL BWP, the Redcap terminal needs to perform frequent BWP switching or Radio Frequency (RF) retuning, etc., which will cause interruption of communication.

SUMMARY

According to a first aspect of embodiments of the present disclosure, there is provided an access control method, including: acquiring a first SSB, where the first SSB includes access information for indicating a second SSB; reading the access information of the second SSB from the first SSB and acquiring the second SSB according to the access information; and performing access according to the second SSB.

According to a second aspect of embodiments of the present disclosure, there is provided another access control method, including: transmitting a first access resource and a second access resource, where the first access resource includes a first SSB, the second access resource includes a second SSB, and the first SSB includes access information for indicating the second SSB; and the access information is used to acquire the second SSB, and access is performed according to the second SSB.

According to a third aspect of embodiments of the present disclosure, there is provided a communication device, including: a transceiver, a memory, and a processor connected to the transceiver and the memory, respectively, the processor being configured, by executing computer-executable instructions on the memory, to control transmission and reception of wireless signals from the transceiver and to be able to implement the access control method proposed in the first aspect of the embodiments of the present disclosure, or, alternatively, to implement the access control method proposed in the second aspect of the embodiments of the present disclosure.

According to a fourth aspect of embodiments of the present disclosure, there is provided a computer storage medium, where the computer storage medium stores computer-executable instructions that, when executed by a processor, enables the processor to implement the access control method proposed in the first aspect of the embodiments of the present disclosure, or, alternatively, to implement the access control method proposed in the second aspect of the embodiments of the present disclosure.

Additional aspects and advantages of the present disclosure will be described in part in the following description, part of which will become apparent from the following description, or will be learned through the practice of the present disclosure.

BRIEF DESCRIPTION OF THE DRAWINGS

The foregoing and/or additional aspects and advantages of the present disclosure will become apparent and readily understood from the following description of embodiments in conjunction with the accompanying drawings.

DETAILED DESCRIPTION

Figure 1:
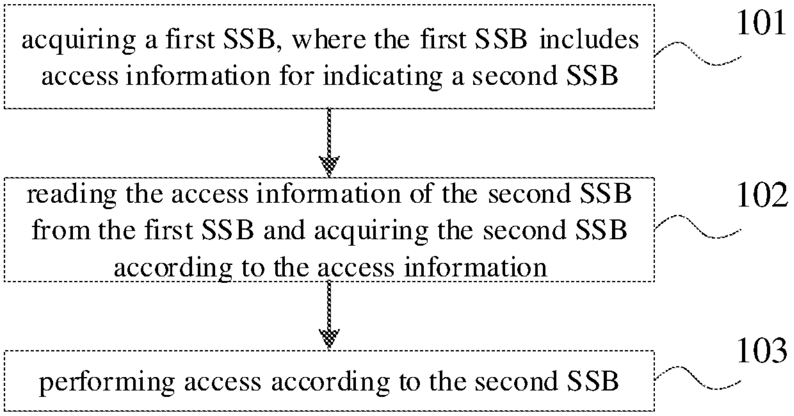
FIG. 1 is a flow diagram of an access control method provided by embodiments of the present disclosure.

Exemplary embodiments will be described herein in detail, examples of which are represented in the accompanying drawings. When the following description relates to the accompanying drawings, the same numerals in different accompanying drawings indicate the same or similar elements unless otherwise indicated. The embodiments described in the following exemplary embodiments do not represent all embodiments that are consistent with the present disclosure. Rather, they are only examples of devices and methods that are consistent with some aspects of the present disclosure, as detailed in the appended claims.

The terms used in embodiments of the present disclosure are intended to describe particular embodiments only, and are not intended to limit embodiments of the present disclosure. The singular forms of "a/an" and "this" as used in the embodiments of the present disclosure and the appended claims are also intended to include plural forms unless the context clearly indicates otherwise. It should also be understood that the term "and/or" as used herein refers to and encompasses any or all possible combinations of one or more of the associated listed items.

It should be understood that although the terms "first", "second", and "third", etc. may be used in the embodiments of the present disclosure to describe various kinds of information, the information should not be limited by these terms. These terms are used only to distinguish the same type of information from one another. For example, without departing from the scope of embodiments of the present disclosure, first information may also be referred to as second information, and similarly, second information may also be referred to as first information, depending on the context. For example, the word if as used herein may be interpreted as “at the time of . . . ”, or “when . . . ”, or “in response to determining . . . ”.

Embodiments of the present disclosure are described in detail below, and examples of the embodiments are illustrated in the accompanying drawings, in which the same or similar signs throughout indicate the same or similar elements. The embodiments described below by reference to the accompanying drawings are exemplary and are intended to be used to explain the present disclosure and are not to be construed as limiting the present disclosure.

Before explaining specific embodiments of the present disclosure, common technical terms are first introduced as follows to facilitate understanding.

Control resource set (CORESET), the concept of which was proposed during the development of New Radio (NR) standard in order to improve the efficiency of blind detection of control channels at terminals. The network side device can configure one or more resource sets for the terminal for sending Physical Downlink Control Channel (PDCCH). The network side device can send control channels to the terminal on any control resource set corresponding to the terminal. In addition, the network side device needs to inform the terminal of other configurations associated with the control resource set, such as the search space set, etc. There are differences in the configuration information of each control resource set, such as frequency domain width differences, time domain length differences, etc.

Reduced capability UE. In Long Term Evolution (LTE) fourth generation mobile communication technology (4G) system, Machine Type Communication (MTC) and Narrow Band Internet of Thing (NB-IoT) technologies are proposed to support IoT services, which are mainly targeted at low-rate and high-latency scenarios, such as meter reading and environmental monitoring. Among them, NB-IoT technology currently supports a maximum transmission rate of several hundred kbps (thousand bits per second), while MTC technology currently supports a maximum transmission rate of several Mbps (million bits per second). However, with the continuous development of IoT services, such as video surveillance, smart home, wearable devices and industrial sensor monitoring, these services usually require transmission rates of tens of Mbps to 100 Mbps, which also have relatively high requirements on delay, so it is difficult for MTC technology and NB-IoT technology in LTE to meet the requirements of the above services. Based on this situation, new user equipment is proposed to be designed in 5G NR to cover the requirements of such middle IoT devices. In the current 3rd Generation Partnership Project (3GPP) standardization, this new type of terminal is called Reduced capability UE or NR-lite for short.

Meanwhile, on the other hand, similar to IoT devices in LTE, 5G-based NR-lite terminals usually need to meet the requirements of low cost, low complexity, some degree of coverage enhancement, power saving, etc.

Coverage enhancement. For Redcap terminals, due to the reduction of terminal capabilities, such as the reduction of receiving antennas, there will be a loss of coverage, so coverage enhancement is required. In this case, the coverage enhancement is performed by using repeated transmission, i.e., repeating the data transmission of the terminal multiple times.

Due to the need for coverage enhancement of the Redcap terminal and the limited reception capability of the Redcap terminal, a separate initial DL BWP or initial UL BWP needs to be configured for the Redcap terminal. Moreover, for the Redcap terminal, if the SSB is not included in the initial DL BWP, the Redcap terminal needs to perform frequent BWP switching or RF retuning, etc., which will cause interruption of communication.

Currently, the method of configuring the initial DL BWP for the Redcap terminal is as follows: the Redcap terminal first reads the SSB of the non-Redcap terminal, then reads the PDCCH in the corresponding CORESET #0, then reads the Remaining Minimum System Information (RMSI), and finally reads the corresponding initial DL BWP configuration in the RMSI. Finally, the Redcap terminal switches to the configured initial DL BWP for access.

However, in the above access method of Redcap terminal, on the one hand, the Redcap terminal needs to read RMSI, PDCCH and Physical Downlink Shared Channel (PDSCH) of the non-Redcap terminal when obtaining the corresponding Initial BWP, which increases the access delay of the Redcap terminal, and on the other hand, the RMSI information of the Redcap terminal may need to be transmitted over two Initial BWPs, which wastes network resources.

In view of the above problems, the present disclosure provides access control methods, apparatuses, a communication device, and medium.

FIG. 1 is a flow diagram of an access control method provided by embodiments of the present disclosure.

As shown in FIG. 1, the access control method may include the following steps.

Step 101, acquiring a first SSB, where the first SSB includes access information for indicating a second SSB.

In the embodiments of the present disclosure, the first SSB may support the monitoring by a first type of terminal and a second type of terminal, while the second SSB only supports the monitoring by the second type of terminal.

The access control method of the embodiments of the present disclosure may be performed by the second type of terminal. The terminal capability of the second type of terminal is different from the terminal capability of the first type of terminal.

In one possible implementation, the first type of terminal may be a terminal with relatively strong terminal capability and the second type of terminal may be a terminal with relatively weak terminal capability, i.e., the terminal capability of the first type of terminal may be stronger than the terminal capability of the second type of terminal.

The terminal capability may include one or more of: transceiver antenna, transceiver bandwidth, processing delay, etc.

For example, the number of transceiver antennas of the first type of terminal may be more than the number of transceiver antennas of the second type of terminal, e.g., the first type of terminal may be a terminal having 2 transceiver antennas, while the second type of terminal may be a terminal having 1 transceiver antenna; and/or, the transceiver bandwidth of the first type of terminal may be greater than the transceiver bandwidth of the second type of terminal; and/or, the processing delay of the first type of terminal may be lower than the processing delay of the second type of terminal.

Optionally, the first type of terminal may be a normal non-Redcap terminal, and the second type of terminal may be a Redcap terminal. Optionally, the first type of terminal may be, for example, a normal NR terminal.

Optionally, the first type of terminal may be a normal NR terminal or a high-grade Redcap terminal, and the second type of terminal may be, for example, a low-grade Redcap terminal. For example, the high-grade Redcap terminal may have 2 transceiver antennas and the low-grade Redcap terminal may have 1 transceiver antenna.

In the embodiments of the present disclosure, the first SSB is included in a first access resource, and the first access resource is configured by the network side device. The first access resource may be a first access channel or a first signaling or a first monitoring resource.

The network side device may be a base station, which may include a plurality of cells that provide service to the terminal. Depending on the specific application, the base station may also be referred to as an access point, or may be a device in the access network that communicates with wireless terminal equipment over the air interface through one or more sectors, or other names.

In the embodiments of the present disclosure, the first access resource configured by the network side device may include the first SSB, which is used to indicate access of the first type of terminal. The first SSB may include access information for indicating the second SSB, and the second SSB is used to indicate access of the second type of terminal. The first SSB may support the monitoring by both the first type of terminal and the second type of terminal, while the second SSB only supports the monitoring by the second type of terminal.

Optionally, the first type of terminal may acquire the first access resource and perform access according to the first SSB included in the first access resource.

For example, the first SSB may also include an access configuration for the first type of terminal, such that the first type of terminal may perform access based on the access configuration contained in the first SSB. For example, the access configuration contained in the first SSB may include the configuration information of CORESET #0, Subcarrier Spacing (SCS), initial DL BWP, and other access configurations.

Step 102, reading the access information of the second SSB from the first SSB and acquiring the second SSB according to the access information.

In the embodiments of the present disclosure, the second SSB may include the configuration information required for the second type of terminal to perform access, i.e., the second SSB may include an access configuration for the second type of terminal. For example, the second SSB may include the configuration information of CORESET #0, SCS, initial DL BWP, and other access configurations.

In the embodiments of the present disclosure, the second type of terminal, after obtaining the first access resource, may monitor the first SSB in the first access resource and read the access information of the second SSB from the first SSB to acquire the second SSB based on the access information of the second SSB.

In one possible implementation, the first SSB may include an access information identifier for indicating a position of the second SSB. Optionally, the access information identifier may be recorded in a spare bit of the first SSB, or in a reserve bit in a SSB index field. That is, the position information of the second SSB may be carried in the first SSB, for example, the bit(s) recorded in the spare bit of the first SSB may be used to indicate the position information of the second SSB, or the bit(s) recorded in the reserve bit in the SSB index field of the first SSB may be used to indicate the position information of the second SSB.

Therefore, in the present disclosure, the second type of terminal can monitor the first SSB in the first access resource and read the access information identifier (i.e., position information) for the position of the second SSB from the first SSB, and further detect the second SSB based on the access information identifier for the position of the second SSB.

In one possible implementation, the second SSB may be included in a second access resource, and the second access resource is configured by the network side device. In the present disclosure, the second type of terminal may acquire the second access resource and detect the second SSB in the second access resource based on the access information of the second SSB, such as the access information identifier for the position of the second SSB.

Step 103, performing access according to the second SSB.

In the embodiments of the present disclosure, the transmission of the first access resource and the second access resource means that both the first access resource and the second access resource are transmitted. Of course, the point in time of transmission is not limited in the embodiments of the disclosure, i.e., the first access resource and the second access resource can be transmitted together or can be transmitted one after the other. In addition, the number of transmissions is not limited, i.e., the first access resource and/or the second access resource can be transmitted only once, or can be transmitted twice or more times.

In the embodiments of the present disclosure, the second type of terminal may perform access according to the second SSB after obtaining the second SSB.

For example, in an application scenario, when the second type of terminal is a Redcap terminal and the first type of terminal is a non-Redcap terminal, the Redcap terminal may obtain the first SSB corresponding to the non-Redcap terminal, where the first SSB contains the position information of the second SSB corresponding to the Redcap terminal. The Redcap terminal may, by reading the position information of the second SSB for the Redcap terminal from the first SSB and detecting the second SSB in the second access resource according to the position information of the second SSB, perform access based on the information carried in the second SSB, such as the position information of CORESET #0 and the initial DL BWP information.

In the embodiments of the present disclosure, the second type of terminal does not need to read the RMSI, PDCCH, PDSCH and other information of the first type of terminal, and can directly read the access information of the second SSB required by itself from the first SSB and acquire the second SSB based on the access information, so that access can be performed based on the second SSB, which can reduce the access delay of the second type of terminal. Moreover, for the second type of terminal, since it is not necessary to read the RMSI information of the first type of terminal from the first SSB but only the configuration information required for its own access from the second SSB, it is not necessary to transmit the RMSI information of the Redcap terminal on the two initial BWPs, and the network occupancy can be reduced.

In the access control method according to the embodiments of the present disclosure, the second type of terminal acquires the first SSB which includes access information for indicating the second SSB, reads the access information of the second SSB from the first SSB and acquires the second SSB according to the access information to perform access according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

Figure 2:
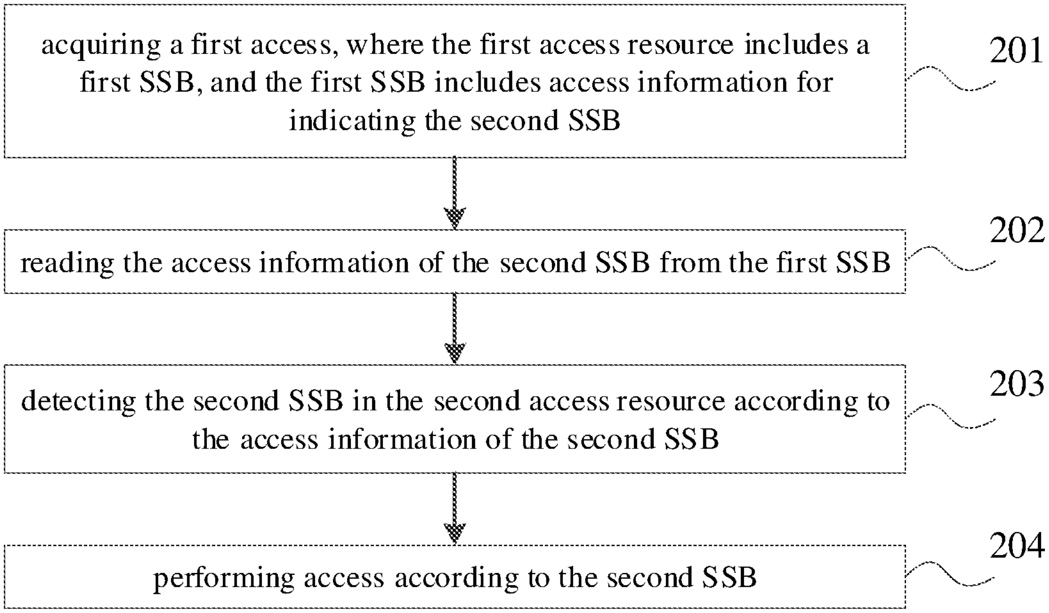
FIG. 2 is a flow diagram of another access control method provided by embodiments of the present disclosure.

According to the embodiments of the present disclosure, there is provided another access control method. FIG. 2 is a flow diagram of another access control method provided by the embodiments of the present disclosure. This access control method is performed by a second type of terminal.

As shown in FIG. 2, the access control method may include the following steps.

Step 201, acquiring a first access resource.

The first access resource includes a first SSB, and the first SSB includes access information for indicating a second SSB.

The first SSB may support the monitoring by both a first type of terminal and a second type of terminal, while the second SSB only supports the monitoring by the second type of terminal.

The access control method of the embodiments of the present disclosure may be performed by the second type of terminal. The terminal capability of the second type of terminal is different from the terminal capability of the first type of terminal.

In one possible implementation, the first type of terminal may be a terminal with relatively strong terminal capability and the second type of terminal may be a terminal with relatively weak terminal capability, i.e., the terminal capability of the first type of terminal may be stronger than the terminal capability of the second type of terminal.

The terminal capability may include one or more of: transceiver antenna, transceiver bandwidth, processing delay, etc.

For example, the number of transceiver antennas of the first type of terminal may be more than the number of transceiver antennas of the second type of terminal, e.g., the first type of terminal may be a terminal having 2 transceiver antennas, while the second type of terminal may be a terminal having 1 transceiver antenna; and/or, the transceiver bandwidth of the first type of terminal may be greater than the transceiver bandwidth of the second type of terminal; and/or, the processing delay of the first type of terminal may be lower than the processing delay of the second type of terminal.

Optionally, the first type of terminal may be a normal non-Redcap terminal, and the second type of terminal may be a Redcap terminal. Optionally, the first type of terminal may be, for example, a normal NR terminal.

Optionally, the first type of terminal may be a normal NR terminal or a high-grade Redcap terminal, and the second type of terminal may be, for example, a low-grade Redcap terminal. For example, the high-grade Redcap terminal may have 2 transceiver antennas and the low-grade Redcap terminal may have 1 transceiver antenna.

In the embodiments of the present disclosure, the first access resource is configured by a network side device. The first access resource may be a first access channel or a first signaling or a first monitoring resource.

The network side device may be a base station, which may include a plurality of cells that provide service to the terminal. Depending on the specific application, the base station may also be referred to as an access point, or may be a device in the access network that communicates with wireless terminal equipment over the air interface through one or more sectors, or other names.

In the embodiments of the present disclosure, the first access resource configured by the network side device may include the first SSB, which is used to indicate access of the first type of terminal. The first SSB may include access information for indicating the second SSB, and the second SSB is used to indicate access of the second type of terminal. The first SSB may support the monitoring by both the first type of terminal and the second type of terminal, while the second SSB only supports the monitoring by the second type of terminal.

Optionally, the first type of terminal may acquire the first access resource and perform access according to the first SSB included in the first access resource.

For example, the first SSB may also include an access configuration for the first type of terminal, such that the first type of terminal may perform access based on the access configuration contained in the first SSB. For example, the access configuration contained in the first SSB may include the configuration information of CORESET #0, SCS, initial DL BWP, and other access configurations.

In one possible implementation, the channel(s) or signaling(s) or monitoring resource(s) in the first access resource other than the first SSB only support the monitoring by the first type of terminal.

In one possible implementation, the second SSB may not be identified by the first type of terminal. Thus, interference with the detection of the first type of terminal can be avoided, and, furthermore, the situation that the first type of terminal performs access based on the second SSB after the second SSB is identified by the first type of terminal, can be avoided.

In one possible implementation, a rule for determining a candidate transmission position(s), or a potential transmission position(s) of the second SSB may be different from a rule for determining a candidate transmission position(s), or a potential transmission position(s) of the first SSB in order to avoid interference with the transmissions of the first type of terminal and the second type of terminal.

Optionally, the rule for determining the candidate transmission position may include a raster requirement met by a transmission frequency point and/or a requirement of a transmission time point. For example, when the rule for determining the candidate transmission position includes the raster requirement met by the transmission frequency point, the transmission frequency point of the first SSB may meet the current transmission raster requirement for SSB, and the transmission frequency point of the second SSB may not be required to meet the current transmission raster requirement for SSB, or the transmission frequency point of the second SSB may avoid the current transmission raster requirement for SSB to avoid invalid detection by the first type of terminal; and/or, when the rule for determining the candidate transmission position includes the requirement of the transmission time point, the transmission time point corresponding to the first SSB may be different from the transmission time point corresponding to the second SSB.

Step 202, reading the access information of the second SSB from the first SSB.

In the embodiments of the present disclosure, the second SSB may include configuration information required for the second type of terminal to perform access, i.e., the second SSB may include an access configuration for the second type of terminal. For example, the second SSB may include the configuration information of CORESET #0, SCS, initial DL BWP, and other access configurations.

In the embodiments of the present disclosure, the second type of terminal, after obtaining the first access resource, may monitor the first SSB in the first access resource and read the access information of the second SSB from the first SSB.

In one possible implementation, the first SSB may include an access information identifier for indicating a position of the second SSB. Optionally, the access information identifier may be recorded in a spare bit of the first SSB, or in a reserve bit in a SSB index field. That is, the position information of the second SSB may be carried in the first SSB, for example, the bit(s) recorded in the spare bit of the first SSB may be used to indicate the position information of the second SSB, or the bit(s) recorded in the reserve bit in the SSB index field of the first SSB may be used to indicate the position information of the second SSB.

Therefore, in the present disclosure, the second type of terminal can monitor the first SSB in the first access resource and read the access information identifier (i.e., position information) for the position of the second SSB from the first SSB to obtain the access information of the second SSB.

Step 203, detecting the second SSB in the second access resource according to the access information of the second SSB.

In the embodiments of the present disclosure, the second access resource is configured by the network side device, and the second access resource may be a second access channel or a second signaling or a second monitoring resource.

In the embodiments of the present disclosure, the second SSB may be included in the second access resource, and the second access resource is configured by the network side device. In the present disclosure, the second type of terminal may acquire the second access resource and detect the second SSB in the second access resource based on the access information of the second SSB, such as the access information identifier for the position of the second SSB.

Optionally, the first access resource and the second access resource may include one or more of: initial BWP, RMSI, Other System Information (OSI), CORESET #0, and SCS.

Optionally, the second access resource may be different from the first access resource. For example, since the terminal capability of the second type of terminal is weaker, in order to achieve coverage enhancement and ensure that the second type of terminal can successfully obtain the access information of the second SSB to acquire the second SSB based on the access information, the information transmitted in the first access resource may be repeatedly transmitted, while the information transmitted in the second access resource may not be retransmitted, in order to reduce the network resource occupation.

Step 204, performing access according to the second SSB.

In the embodiments of the present disclosure, the second type of terminal may, after obtaining the second SSB, perform access according to the second SSB.

For example, in an application scenario, when the second type of terminal is a Redcap terminal and the first type of terminal is a non-Redcap terminal, the Redcap terminal may obtain the first SSB corresponding to the non-Redcap terminal, where the first SSB contains the position information of the second SSB corresponding to the Redcap terminal. The Redcap terminal may, by reading the position information of the second SSB for the Redcap terminal from the first SSB and detecting the second SSB in the second access resource according to the position information of the second SSB, perform access based on the information carried in the second SSB, such as the position information of CORESET #0 and the initial DL BWP information.

In the access control method according to the embodiments of the present disclosure, the second type of terminal acquires the first SSB which includes access information for indicating the second SSB, reads the access information of the second SSB from the first SSB and acquires the second SSB according to the access information to perform access according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

In the embodiments of the present disclosure, the transmission of the first access resource and the second access resource means that both the first access resource and the second access resource are transmitted. Of course, the point in time of transmission is not limited in the embodiments of the disclosure, i.e., the first access resource and the second access resource may be transmitted together or may be transmitted one after the other. In addition, the number of transmissions is not limited, i.e., the first access resource and/or the second access resource may be transmitted only once, or may be transmitted twice or more times.

Figure 3:
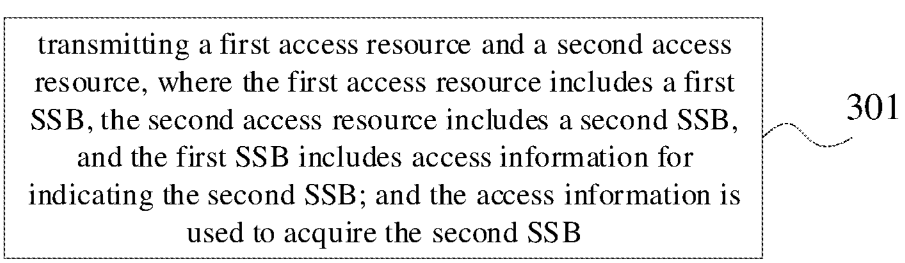
FIG. 3 is a flow diagram of yet another access control method provided by embodiments of the present disclosure.

According to the embodiments of the present disclosure, there is provided yet another access control method. FIG. 3 is a flow diagram of yet another access control method provided by embodiments of the present disclosure. This access control method is performed by a network side device.

The network side device may be a base station, which may include a plurality of cells that provide service to the terminal. Depending on the specific application, the base station may also be referred to as an access point, or may be a device in the access network that communicates with wireless terminal equipment over the air interface through one or more sectors, or other names.

As shown in FIG. 3, the access control method may include the following steps.

Step 301, transmitting a first access resource and a second access resource, where the first access resource includes a first SSB, the second access resource includes a second SSB, and the first SSB includes access information for indicating the second SSB; and the access information is used to acquire the second SSB.

The second SSB is used to enable a second type of terminal to perform access according to the second SSB.

The first SSB may support the monitoring by both a first type of terminal and the second type of terminal, while the second SSB only supports the monitoring by the second type of terminal.

In the embodiments of the present disclosure, the transmission of the first access resource and the second access resource means that both the first access resource and the second access resource are transmitted. Of course, the point in time of transmission is not limited in the embodiments of the disclosure, i.e., the first access resource and the second access resource may be transmitted together or may be transmitted one after the other. In addition, the number of transmissions is not limited, i.e., the first access resource and/or the second access resource may be transmitted only once, or may be transmitted twice or more times.

In the embodiments of the present disclosure, the first access resource and the second access resource are both configured by the network side device; and the first access resource and the second access resource may be referred to as access channels or signalings or monitoring resources.

In the embodiments of the present disclosure, the terminal capability of the second type of terminal is different from the terminal capability of the first type of terminal.

In one possible implementation, the first type of terminal may be a terminal with relatively strong terminal capability and the second type of terminal may be a terminal with relatively weak terminal capability, i.e., the terminal capability of the first type of terminal may be stronger than the terminal capability of the second type of terminal.

The terminal capability may include one or more of: transceiver antenna, transceiver bandwidth, processing delay, etc.

For example, the number of transceiver antennas of the first type of terminal may be more than the number of transceiver antennas of the second type of terminal, e.g., the first type of terminal may be a terminal having 2 transceiver antennas, while the second type of terminal may be a terminal having 1 transceiver antenna; and/or, the transceiver bandwidth of the first type of terminal may be greater than the transceiver bandwidth of the second type of terminal; and/or, the processing delay of the first type of terminal may be lower than the processing delay of the second type of terminal.

Optionally, the first type of terminal may be a normal non-Redcap terminal, and the second type of terminal may be a Redcap terminal. Optionally, the first type of terminal may be, for example, a normal NR terminal.

Optionally, the first type of terminal may be a normal NR terminal or a high-grade Redcap terminal, and the second type of terminal may be, for example, a low-grade Redcap terminal. For example, the high-grade Redcap terminal may have 2 transceiver antennas and the low-grade Redcap terminal may have 1 transceiver antenna.

In the embodiments of the present disclosure, the first access resource configured by the network side device may include the first SSB, which is used to indicate access of the first type of terminal. The first SSB may include access information for indicating the second SSB, and the second SSB is used to indicate access of the second type of terminal. The first SSB may support the monitoring by both the first type of terminal and the second type of terminal, while the second SSB only supports monitoring by the second type of terminal.

In the embodiments of the present disclosure, the second access resource may include the second SSB, and the second SSB may include configuration information required for the second type of terminal to perform access, i.e., the second SSB may include an access configuration for the second type of terminal. For example, the second SSB may include the configuration information of CORESET #0, SCS, initial DL BWP, and other access configurations.

In the embodiments of the present disclosure, the network side device may transmit the first access resource and the second access resource, so that when the second type of terminal may, after obtaining the first access resource, monitor the first SSB in the first access resource and read the access information of the second SSB from the first SSB.

In one possible implementation, the first SSB may include an access information identifier for indicating a position of the second SSB. Optionally, the access information identifier may be recorded in a spare bit of the first SSB, or in a reserve bit in a SSB index field. That is, the position information of the second SSB may be carried in the first SSB, for example, the bit(s) recorded in the spare bit of the first SSB may be used to indicate the position information of the second SSB, or the bit(s) recorded in the reserve bit in the SSB index field of the first SSB may be used to indicate the position information of the second SSB.

Therefore, in the present disclosure, the second type of terminal can monitor the first SSB in the first access resource and read the access information identifier (i.e., position information) for the position of the second SSB from the first SSB to obtain the access information of the second SSB. After that, the second type of terminal can detect the second SSB in the second access resource based on the access information of the second SSB, such as the access information identifier for the position of the second SSB. The second type of terminal can, after obtaining the second SSB, perform access based on the second SSB.

Optionally, the first type of terminal may acquire the first access resource and perform access according to the first SSB included in the first access resource.

For example, the first SSB may also include an access configuration for the first type of terminal, such that the first type of terminal may perform access based on the access configuration contained in the first SSB. For example, the access configuration contained in the first SSB may include the configuration information of CORESET #0, SCS, initial DL BWP, and other access configurations.

For example, in an application scenario, when the second type of terminal is a Redcap terminal or the first type of terminal is a non-Redcap terminal, the Redcap terminal may obtain the first SSB corresponding to the non-Redcap terminal, where the first SSB contains the position information of the second SSB corresponding to the Redcap terminal. The Redcap terminal may, by reading the position information of the second SSB for the Redcap terminal from the first SSB and detecting the second SSB in the second access resource according to the position information of the second SSB, perform access based on the information carried in the second SSB, such as the position information of CORESET #0 and the initial DL BWP information.

Optionally, the first access resource and the second access resource may include one or more of: initial BWP, RMSI, OSI, CORESET #0, and SCS.

Optionally, the second access resource may be different from the first access resource. For example, since the terminal capability of the second type of terminal is weaker, in order to achieve coverage enhancement and ensure that the second type of terminal can successfully obtain the access information of the second SSB to acquire the second SSB based on the access information, the information transmitted in the first access resource may be repeatedly transmitted, while the information transmitted in the second access resource may not be retransmitted, in order to reduce the network resource occupation.

In one possible implementation, the channel(s) or signaling(s) or monitoring resource(s) in the first access resource other than the first SSB only support the monitoring by the first type of terminal.

In one possible implementation, the second SSB may not be identified by the first type of terminal. Thus, interference with the detection of the first type of terminal can be avoided, and, furthermore, the situation that the first type of terminal performs access based on the second SSB after the second SSB is identified by the first type of terminal, can be avoided.

In one possible implementation, a rule for determining a candidate transmission position of the second SSB may be different from a rule for determining a candidate transmission position of the first SSB in order to avoid interference with the transmissions of the first type of terminal and the second type of terminal.

Optionally, the rule for determining the candidate transmission position may include a raster requirement met by a transmission frequency point and/or a requirement of a transmission time point. For example, when the rule for determining the candidate transmission position includes the raster requirement met by the transmission frequency point, the transmission frequency point of the first SSB may meet the current transmission raster requirement for SSB, and the transmission frequency point of the second SSB may not be required to meet the current transmission raster requirement for SSB, or the transmission frequency point of the second SSB may avoid the current transmission raster requirement for SSB to avoid invalid detection by the first type of terminal; and/or, when the rule for determining the candidate transmission position includes the requirement of the transmission time point, the transmission time point corresponding to the first SSB may be different from the transmission time point corresponding to the second SSB.

In the access control method according to the embodiments of the present disclosure, the network side device transmits the first access resource and the second access resource, where the first access resource includes the first SSB and the second access resource includes the second SSB, and the first SSB includes access information for indicating the second SSB; and the access information is used to acquire the second SSB and access is performed according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

Corresponding to the access control methods provided in the above embodiments of FIGS. 1 and 2, the present disclosure also provides an access control apparatus. Since the access control apparatus provided in the embodiments of the present disclosure corresponds to the access control methods provided in the above embodiments of FIGS. 1 and 2, the implementations of the access control methods are also applicable to the access control apparatus provided in this embodiment of the present disclosure, which will not be described in detail in this embodiment of the present disclosure.

Figure 4:
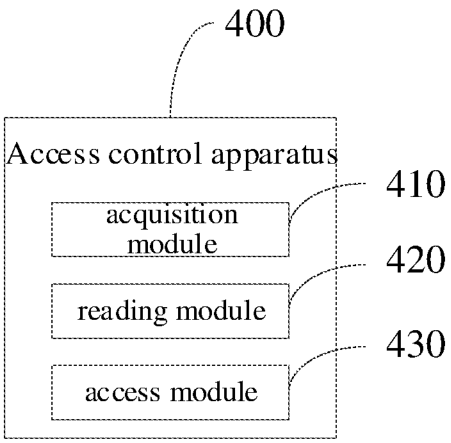
FIG. 4 is a schematic diagram of an access control apparatus provided by embodiments of the present disclosure.

FIG. 4 is a schematic diagram of an access control apparatus provided by embodiments of the present disclosure. The apparatus is applied to a second type of terminal.

As shown in FIG. 4, the access control apparatus 400 may include: an acquisition module 410, a reading module 420, and an access module 430.

The acquisition module 410 is configured to acquire a first SSB, where the first SSB includes access information for indicating a second SSB.

The reading module 420 is configured to read the access information of the second SSB from the first SSB and acquire the second SSB according to the access information.

The access module 430 is configured to perform access according to the second SSB.

In some embodiments of the present disclosure, the first SSB supports monitoring by a first type of terminal and a second type of terminal, and the second SSB only supports the monitoring by the second type of terminal.

In some embodiments of the present disclosure, a terminal capability of the first type of terminal is stronger than a terminal capability of the second type of terminal.

In some embodiments of the present disclosure, the terminal capability includes one or more of: transceiver antenna, transceiver bandwidth, and processing delay.

In some embodiments of the present disclosure, the second SSB is not recognized by the first type of terminal.

In some embodiments of the present disclosure, the second SSB is not identified by the first type of terminal.

In some embodiments of the present disclosure, the first SSB includes an access information identifier for indicating a position of the second SSB.

In some embodiments of the present disclosure, the first SSB further includes an access configuration for a first type of terminal, and the second SSB includes an access configuration for a second type of terminal.

In some embodiments of the present disclosure, a rule for determining a candidate transmission position of the second SSB is different from a rule for determining a candidate transmission position of the first SSB.

In some embodiments of the present disclosure, the rule for determining the candidate transmission position includes a raster requirement met by a transmission frequency point and/or a requirement of a transmission time point.

In some embodiments of the present disclosure, the first SSB is contained in a first access resource.

In some embodiments of the present disclosure, the second SSB is contained in a second access resource.

In some embodiments of the present disclosure, the second access resource is different from the first access resource.

In some embodiments of the present disclosure, the first access resource and the second access resource include one or more of: an initial bandwidth part (BWP), remaining minimum system information (RMSI), other system information (OSI), a control resource set (CORESET) #0, and subcarrier spacing (SCS).

In some embodiments of the present disclosure, the access information identifier is recorded in a spare bit of the first SSB, or the access information identifier is recorded in a reserve bit in a SSB index field of the first SSB.

In the access control apparatus according to the embodiments of the present disclosure, the first SSB is acquired, where the first SSB includes access information for indicating the second SSB; the access information of the second SSB is read from the first SSB and the second SSB is acquired according to the access information, so that access is performed according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

Corresponding to the access control method provided in the above embodiments of FIG. 3, the present disclosure also provides an access control apparatus. Since the access control apparatus provided in the embodiments of the present disclosure corresponds to the access control method provided in the above embodiments of FIG. 3, the implementations of the access control method provided in the embodiments of FIG. 3 are also applicable to the access control apparatus provided in this embodiment and will not be described in detail in this embodiment of the present disclosure.

Figure 5:
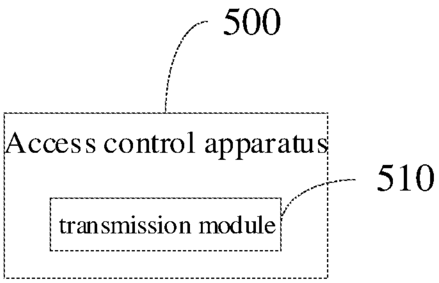
FIG. 5 is a schematic diagram of another access control apparatus provided by embodiments of the present disclosure.

FIG. 5 is a schematic diagram of another access control apparatus provided by embodiments of the present disclosure. The apparatus is applied to a network side device.

As shown in FIG. 5, the access control apparatus 500 may include: a transmission module 510.

The transmission module 510 is configured to transmit a first access resource and a second access resource, where the first access resource includes a first SSB, the second access resource includes a second SSB, and the first SSB includes access information for indicating the second SSB; and where the access information is used to acquire the second SSB, and access is performed according to the second SSB.

Optionally, the first SSB supports monitoring by a first type of terminal and a second type of terminal, and the second SSB only supports the monitoring by the second type of terminal.

In some embodiments of the present disclosure, optionally, a terminal capability of the first type of terminal is stronger than a terminal capability of the second type of terminal.

Optionally, the terminal capability includes one or more of: transceiver antenna, transceiver bandwidth, and processing delay.

In some embodiments of the present disclosure, the second SSB is not identified by the first type of terminal.

In some embodiments of the present disclosure, the first SSB includes an access information identifier for indicating a position of the second SSB.

In some embodiments of the present disclosure, the first SSB further includes an access configuration for a first type of terminal, and the second SSB includes an access configuration for a second type of terminal.

In some embodiments of the present disclosure, a rule for determining a candidate transmission position of the second SSB is different from a rule for determining a candidate transmission position of the first SSB.

In some embodiments of the present disclosure, the rule for determining the candidate transmission position includes a raster requirement met by a transmission frequency point and/or a requirement of a transmission time point.

In some embodiments of the present disclosure, the second access resource is different from the first access resource.

In some embodiments of the present disclosure, the first access resource and the second access resource include one or more of: an initial bandwidth part (BWP), remaining minimum system information (RMSI), other system information (OSI), a control resource set (CORESET) #0, and subcarrier spacing (SCS).

In some embodiments of the present disclosure, the access information identifier is recorded in a spare bit of the first SSB, or the access information identifier is recorded in a reserve bit in a SSB index field of the first SSB.

In the access control apparatus according to the embodiments of the present disclosure, the network side device transmits the first access resource and the second access resource, where the first access resource includes the first SSB and the second access resource includes the second SSB, and the first SSB includes access information for indicating the second SSB; and the access information is used to acquire the second SSB and access is performed according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

In order to implement the above embodiments, the present disclosure also provides a communication device.

The communication device, provided by the embodiments of the present disclosure, includes a processor, a transceiver, a memory, and an executable program that is stored on the memory and can be run by the processor. The processor, when running the executable program, executes the access control method corresponding to the preceding embodiments of any of FIGS. 1 to 2, or, alternatively, executes the access control method corresponding to the preceding embodiments of FIG. 3.

The communication device may be the second type of terminal or network side device as described above.

The processor may include various types of storage medium that are non-transitory computer storage medium that are capable of continuing to store information thereon in memory after the communication device is powered down. Here, the communication device includes the second type of terminal or network side device.

The processor may be connected to the memory via a bus, etc., for reading an executable program stored on the memory to implement the foregoing access control method, for example, as in at least one of FIGS. 1 to 3.

In order to implement the above embodiments, the present disclosure also provides a computer storage medium.

The computer storage medium, provided by embodiments of the present disclosure, stores an executable program that, when executed by a processor, causes the processor to implement the foregoing access control method, for example, as in at least one of FIGS. 1 to 3.

Figure 6:
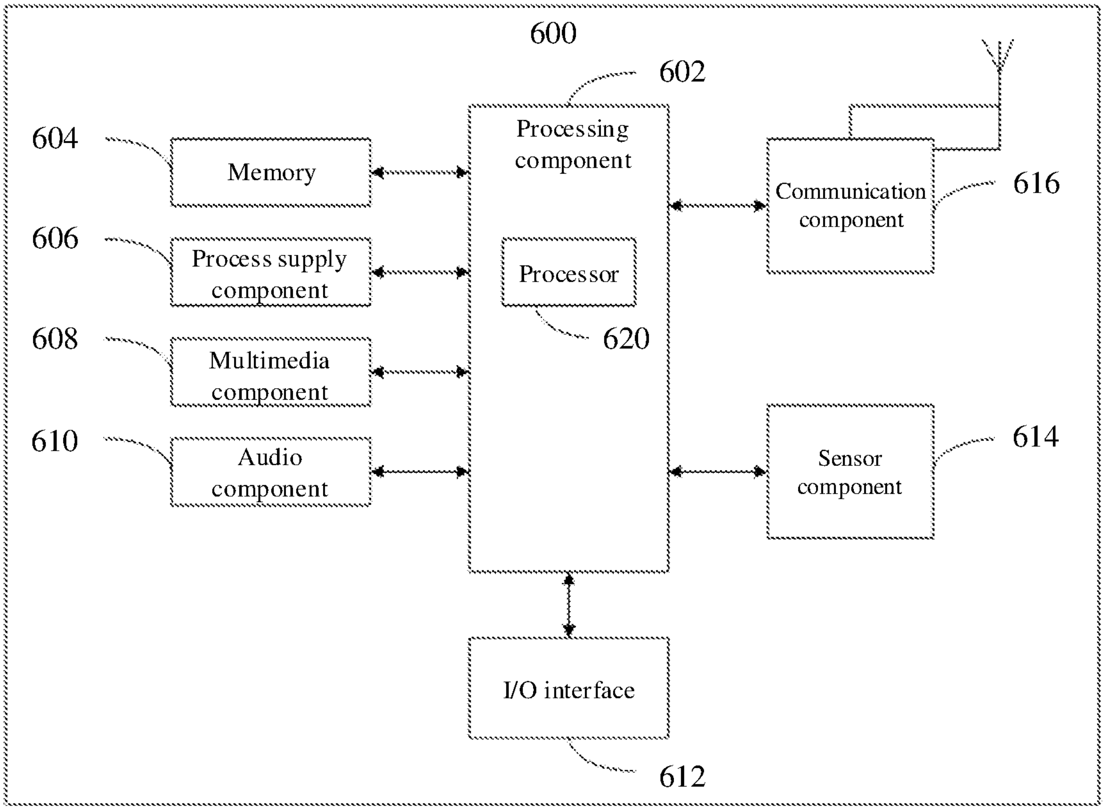
FIG. 6 is a schematic diagram of a second type of terminal provided by embodiments of the present disclosure.

FIG. 6 is a schematic diagram of a second type of terminal provided by embodiments of the present disclosure. For example, the second type of terminal 600 may be a mobile phone, a computer, a digital broadcast subscriber device, a message sending and receiving device, a game console, a tablet device, a medical device, a fitness device, a personal digital assistant, and the like.

Referring to FIG. 6, the second type of terminal 600 may include at least one of the following components: a processing component 602, a memory 604, a power supply component 606, a multimedia component 608, an audio component 610, an input/output (I/O) interface 612, a sensor component 614, and a communication component 616.

The processing component 602 generally controls the overall operation of the second type of terminal 600, such as operations associated with display, telephone call, data communication, camera operation, and recording operations. The processing component 602 may include at least one processor 620 to execute instructions to complete all or some of the steps of the methods described above. In addition, the processing component 602 may include at least one module to facilitate interaction between the processing component 602 and other components. For example, the processing component 602 may include a multimedia module to facilitate interaction between the multimedia component 608 and the processing component 602.

The memory 604 is configured to store various types of data to support operation at the second type of terminal 600. Examples of such data include instructions for any application or method operating on the second type of terminal 600, contact data, phonebook data, messages, pictures, videos, etc. The memory 604 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power supply component 606 provides power to various components of the second type of terminal 600. The power supply component 606 may include a power management system, at least one power supply, and other components associated with generating, managing, and distributing power for the second type of terminal 600.

The multimedia component 608 includes a screen that provides an output interface between the second type of terminal 600 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touch, swipe, and gesture on the touch panel. The touch sensor may not only sense the boundaries of the touch or swipe action, but also detect the wake-up time and pressure associated with the touch or swipe action. In some embodiments, the multimedia component 608 includes a front-facing camera and/or a rear-facing camera. The front camera and/or rear camera can receive external multimedia data when the second type of terminal 600 is in an operating mode, such as shooting mode or video mode. Each front camera and rear camera may be a fixed optical lens system or have focal length and optical zoom capability.

The audio component 610 is configured to output and/or input audio signals. For example, the audio component 610 includes a microphone (MIC) configured to receive external audio signals when the second type of terminal 600 is in an operating mode, such as call mode, recording mode, and voice recognition mode. The received audio signal may be further stored in memory 604 or sent via communication component 616. In some embodiments, the audio component 610 further includes a speaker for outputting an audio signal.

The I/O interface 612 provides an interface between the processing processor 602 and the peripheral interface modules, and the peripheral interface modules may be keypads, click wheels, buttons, etc. These buttons may include, but are not limited to: home button, volume button, start button, and lock button.

The sensor component 614 includes at least one sensor for providing status assessment of various aspects of the second type of terminal 600. For example, the sensor component 614 may detect an open/closed state of the device 600, and the relative positioning of components. For example, the components are the display and keypad of the second type of terminal 600. The sensor component 614 may also detect a change in the position of the second type of terminal 600 or a component of the second type of terminal 600, the presence or absence of user contact with the second type of terminal 600, the orientation or acceleration/deceleration of the second type of terminal 600, and a change in temperature of the second type of terminal 600. The sensor component 614 may include a proximity sensor configured to detect the presence of a nearby object in the absence of any physical contact. The sensor component 614 may also include a light sensor, such as a CMOS or CCD image sensor, for use in an imaging application. In some embodiments, the sensor component 614 may also include an accelerometer sensor, a gyroscope sensor, a magnetic sensor, a pressure sensor, or a temperature sensor.

The communication component 616 is configured to facilitate communication between the second type of terminal 600 and other devices by wired or wireless means. The second type of terminal 600 may access a wireless network based on a communication standard such as WiFi, 2G or 3G, or a combination thereof. In an exemplary embodiment, the communication component 616 receives broadcast signals or broadcast-related information from an external broadcast management system via a broadcast channel. In an exemplary embodiment, the communication component 616 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth® (BT) technology, and other technologies.

In exemplary embodiments, the second type of terminal 600 may be implemented by at least one application-specific integrated circuit (ASIC), digital signal processor (DSP), digital signal processing device (DSPD), programmable logic device (PLD), field-programmable gate array (FPGA), controller, microcontroller, microprocessor, or other electronic component for performing any of the methods in FIGS. 1 to 3 as described above.

In exemplary embodiments, there is also provided a non-transitory computer readable storage medium including instructions, such as the memory 604 including instructions, the instructions being executable by the processor 620 of the second type of terminal 600 to accomplish any of the methods in FIGS. 1 to 3 as described above. For example, the non-transitory computer readable storage medium may be ROM, random access memory (RAM), CD-ROM, magnetic tape, floppy disk, and optical data storage devices, among others.

Figure 7:
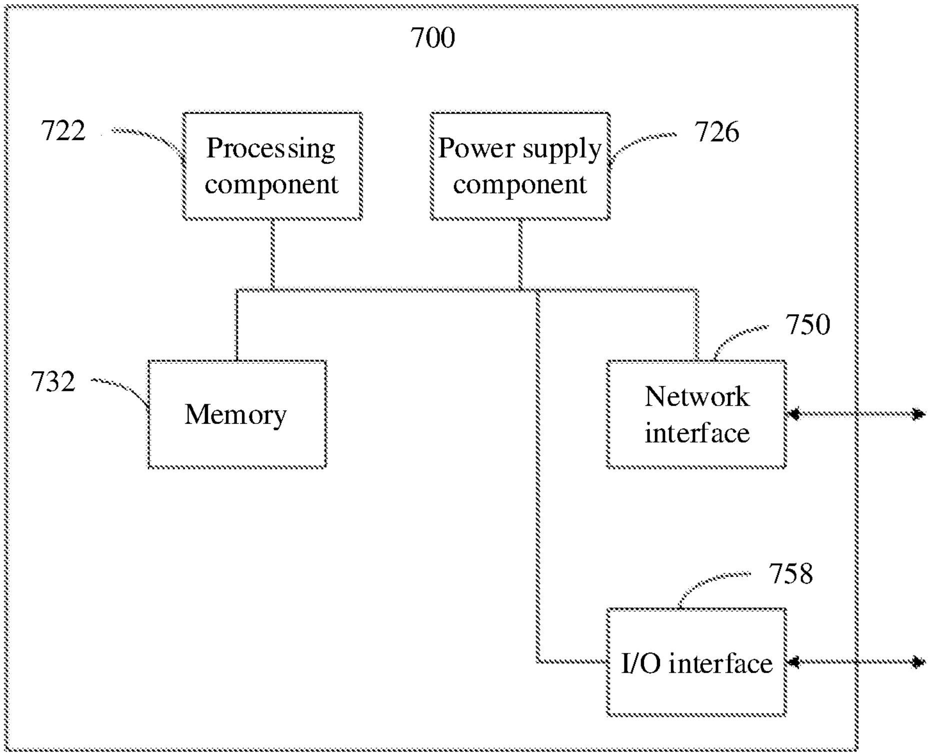
FIG. 7 is a schematic diagram of a network side device provided by embodiments of the present disclosure.

As shown in FIG. 7, FIG. 7 is a schematic diagram of a network side device provided by embodiments of the present disclosure. For example, the network side device 700 may be provided as a network device. Referring to FIG. 7, the network side device 700 includes a processing component 722, which further includes at least one processor, and a memory resource represented by a memory 732 for storing instructions, such as an application program, executable by the processing component 722. The application programs stored in memory 732 may include one or more modules each corresponding to a set of instructions. In addition, the processing component 722 is configured to execute the instructions to perform any of the methods described above applied to the network side device, for example, as the method shown in FIG. 3.

The network side device 700 may also include a power supply component 726 configured to perform power management of the network side device 700, a wired or wireless network interface 750 configured to connect the network side device 700 to a network, and an input and output (I/O) interface 758. The network side device 700 may operate an operating system based on an operating system stored in memory 732, such as Windows Server™, Mac OS X™, Unix™, Linux™, FreeBSD™, or the like.

In the access control methods, apparatuses, the communication device and medium provided by the embodiments of the present disclosure, the second type of terminal acquires the first SSB which includes access information for indicating the second SSB, reads the access information of the second SSB from the first SSB and acquires the second SSB according to the access information to perform access according to the second SSB. Thus, the second type of terminal does not need to read the RMSI, PDCCH, PDSCH and other information of the first type of terminal, and can directly read the access information of the second SSB required by itself from the first SSB and acquire the second SSB based on the access information, so as to perform access according to the second SSB, which can reduce the access delay of the second type of terminal.

Other embodiments of the application will readily come to the mind of those skilled in the art upon consideration of the specification and practice of the application disclosed herein. This disclosure is intended to cover any variation, use, or adaptation of the application that follows the general principles of the application and includes commonly known or customary technical means in the art that are not disclosed herein. The specification and embodiments are to be considered exemplary only, and the true scope and spirit of the present disclosure is indicated by the following claims.

It should be understood that the present disclosure is not limited to the precise construction already described above and illustrated in the accompanying drawings, and that various modifications and changes may be made without departing from its scope. The scope of the present disclosure is limited only by the appended claims.

What is claimed is:

1. An access control method, comprising:

acquiring a first synchronization signal/physical broadcast channel block (SSB) that supports monitoring by a first type of terminal and a second type of terminal, wherein a terminal capability of the first type of terminal is stronger than a terminal capability of the second type of terminal, and wherein the first SSB comprises access information for determining a candidate transmission position of a second SSB, a rule for determining the candidate transmission position of the second SSB being different from a rule for determining a candidate transmission position of the first SSB;

reading, from the first SSB, the access information of the second SSB and acquiring the second SSB according to the access information, wherein the second SSB supports monitoring by the second type of terminal; and performing access according to the second SSB.

2. The method of claim 1, wherein the terminal capability comprises one or more of: transceiver antenna, transceiver bandwidth, and processing delay.

3. The method of claim 1, wherein the second SSB is not identified by the first type of terminal.

4. The method of claim 1, wherein the first SSB comprises an access information identifier for indicating a position of the second SSB.

5. The method of claim 1, wherein the first SSB further comprises an access configuration for a first type of terminal, and the second SSB comprises an access configuration for a second type of terminal.

6. The method of claim 1, wherein the rule for determining the candidate transmission position comprises at least one of a requirement to be met by a raster or a requirement to be met by transmission time.

7. The method of claim 1, wherein the first SSB is contained in a first access resource, and the method further comprises:

acquiring, by a first type of terminal, the first access resource.

8. The method of claim 7, wherein the second SSB is contained in a second access resource, and the method further comprises:

acquiring, by a second type of terminal, the second access resource.

9. The method of claim 8, wherein the second access resource is different from the first access resource.

10. The method of claim 8, wherein the first access resource and the second access resource comprise access configuration information that includes one or more of: an initial bandwidth part (BWP), remaining minimum system information (RMSI), other system information (OSI), a control resource set (CORESET) #0, and subcarrier spacing (SCS).

11. The method of claim 4, wherein the access information identifier is recorded in one of a spare bit of the first SSB, or a reserve bit in a SSB index field of the first SSB.

12. An access control method, comprising:

transmitting a first access resource and a second access resource, wherein the first access resource comprises a first synchronization signal/physical broadcast channel block (SSB) that supports monitoring by a first type of terminal and a second type of terminal, the second access resource comprises a second SSB that supports monitoring by the second type of terminal, wherein a terminal capability of the first type of terminal is stronger than a terminal capability of the second type of terminal, and the first SSB comprises access information for determining a candidate transmission position of the second SSB, a rule for determining the candidate transmission position of the second SSB being different from a rule for determining a candidate transmission position of the first SSB the second SSB;

wherein the access information is configured to acquire the second SSB, and access is performed according to the second SSB.

13. The method of claim 12, wherein the second SSB is not identified by the first type of terminal;

and the terminal capability comprises one or more of: transceiver antenna, transceiver bandwidth, and processing delay.

14. The method of claim 12, wherein the first SSB comprises at least one of: an access configuration for a first type of terminal, or an access information identifier for indicating a position of the second SSB, the access information identifier being recorded in one of a spare bit of the first SSB, or a reserve bit in a SSB index field of the first SSB; and the second SSB comprises an access configuration for a second type of terminal.

15. The method of claim 12, wherein the rule for determining the candidate transmission position comprises at least one of: a requirement to be met by a raster, or a requirement to be met by transmission time.

16. The method of claim 12, wherein the second access resource is different from the first access resource; and the first access resource and the second access resource comprise access configuration information that includes one or more of: an initial bandwidth part (BWP), remaining minimum system information (RMSI), other system information (OSI), a control resource set (CORESET) #0, and subcarrier spacing (SCS).

17. A communication device, comprising:

a transceiver, a memory, and a processor connected to the transceiver and the memory, respectively, the processor being configured, by executing computer-executable instructions on the memory, to:

acquire a first synchronization signal/physical broadcast channel block (SSB) that supports monitoring by a first type of terminal and a second type of terminal, wherein a terminal capability of the first type of terminal is stronger than a terminal capability of the second type of terminal, and wherein the first SSB comprises access information for determining a candidate transmission position of a second SSB, a rule for determining the candidate transmission position of the second SSB being different from a rule for determining a candidate transmission position of the first SSB;

read, from the first SSB, the access information of the second SSB and acquire the second SSB according to the access information, wherein the second SSB supports monitoring by the second type of terminal; and perform access according to the second SSB.

18. A non-transitory computer-readable storage medium having stored thereon instructions that, when executed by a processor, causes the processor to perform the method of claim 1.

* * * * *